(12) United States Patent
Wang et al.

(10) Patent No.: US 12,446,331 B2
(45) Date of Patent: Oct. 14, 2025

(54) PHOTOVOLTAIC SOLAR CELL MODULE AND MANUFACTURING METHOD THEREOF

(71) Applicant: Suzhou Maizhan Automation Technology Co., Ltd., Suzhou (CN)

(72) Inventors: Xin Wang, Suzhou (CN); Jing Zheng, Suzhou (CN)

(73) Assignee: Suzhou Maizhan Automation Technology Co., Ltd., Suzhou (CN)

( * ) Notice: Subject to any disclaimer, the term of this patent is extended or adjusted under 35 U.S.C. 154(b) by 0 days.

(21) Appl. No.: 18/817,266

(22) Filed: Aug. 28, 2024

(65) Prior Publication Data
US 2024/0421240 A1    Dec. 19, 2024

Related U.S. Application Data

(63) Continuation of application No. PCT/CN2023/087900, filed on Apr. 12, 2023.

(30) Foreign Application Priority Data

Nov. 21, 2022  (CN) .......................... 2022115450829

(51) Int. Cl.
H10F 19/90    (2025.01)

(52) U.S. Cl.
CPC ......... H10F 19/904 (2025.01); H10F 19/902 (2025.01)

(58) Field of Classification Search
CPC .... H10F 19/902; H10F 19/904; H10F 19/906; H10F 71/1375
See application file for complete search history.

(56) References Cited

U.S. PATENT DOCUMENTS

| | | | | |
|---|---|---|---|---|
| 4,652,693 A | * | 3/1987 | Bar-On | ................. H10F 77/937 136/251 |
| 2007/0235077 A1 | * | 10/2007 | Nagata | .............. B32B 17/10788 136/256 |
| 2009/0107538 A1 | * | 4/2009 | Luch | ..................... H10F 19/904 156/60 |
| 2010/0275969 A1 | * | 11/2010 | Chan | ..................... H10F 19/902 136/244 |
| 2010/0282292 A1 | * | 11/2010 | Malik | ..................... H10F 19/80 438/66 |

(Continued)

FOREIGN PATENT DOCUMENTS

| CN | 110137311 A | 8/2019 |
|---|---|---|
| CN | 113695796 A | 11/2021 |
| CN | 115224161 A | 10/2022 |

*Primary Examiner* — Golam Mowla
(74) *Attorney, Agent, or Firm* — Nitin Kaushik

(57) ABSTRACT

The present invention discloses a manufacturing method of a photovoltaic solar cell module, and belongs to the technical field of solar photovoltaic device manufacturing. In the present invention, a metal connecting ribbon is adopted for connecting a cell, and front and rear surfaces of the cell are designed by removing PAD dots, so that optical shielding on a surface of the cell is reduced, and the cost is reduced. The metal connecting ribbon and the cell are welded into a cell string by a jig and a manipulator and the risk of unstable connection is substantially eliminated by providing an adhesive pattern on the metal connecting ribbon of the cell string and curing.

13 Claims, 6 Drawing Sheets

(56) References Cited

U.S. PATENT DOCUMENTS

| | | | |
|---|---|---|---|
| 2013/0269748 A1* | 10/2013 | Wiedeman | H10F 19/70 |
| | | | 438/66 |
| 2013/0312810 A1* | 11/2013 | Hamaguchi | H10F 71/00 |
| | | | 438/73 |
| 2014/0069479 A1* | 3/2014 | Yang | H10F 19/906 |
| | | | 438/66 |
| 2014/0213013 A1* | 7/2014 | Britt | H10F 19/35 |
| | | | 438/80 |
| 2014/0262793 A1* | 9/2014 | Babayan | H10F 77/215 |
| | | | 205/78 |
| 2014/0373892 A1* | 12/2014 | Bergmann | H10F 71/00 |
| | | | 156/380.9 |
| 2015/0129024 A1* | 5/2015 | Brainard | H10F 77/211 |
| | | | 438/98 |
| 2015/0136207 A1* | 5/2015 | Giron | B32B 17/10889 |
| | | | 438/66 |
| 2016/0126390 A1* | 5/2016 | Zhao | H10F 77/215 |
| | | | 438/66 |
| 2016/0126391 A1* | 5/2016 | Sun | H10F 19/85 |
| | | | 438/66 |
| 2017/0186897 A1* | 6/2017 | Atchley | H02S 40/36 |
| 2018/0122966 A1* | 5/2018 | Yoshikawa | H10F 19/80 |
| 2019/0109349 A1* | 4/2019 | Thiel | H01M 50/298 |
| 2019/0260332 A1* | 8/2019 | Yang | H10F 19/80 |
| 2019/0267931 A1* | 8/2019 | Yang | H02S 30/10 |
| 2024/0234608 A1* | 7/2024 | Wang | H10F 77/211 |

\* cited by examiner

PHOTOVOLTAIC SOLAR CELL MODULE AND MANUFACTURING METHOD THEREOF

CROSS-REFERENCE TO RELATED APPLICATIONS

The application claims priority to Chinese patent application No. 2022115450829, filed on Nov. 21, 2022, the entire contents of which are incorporated herein by reference.

TECHNICAL FIELD

The present invention relates to the technical field of solar photovoltaic device manufacturing, and more particularly relates to a photovoltaic solar cell module and a manufacturing method thereof.

BACKGROUND

In the field of solar photovoltaic modules at home and abroad, in a conventional photovoltaic solar module, silver is deposited on a surface of a photovoltaic solar cell by means of screen printing and the like to fabricate a conductive grid line, and the purpose of improving the mechanical strength thereof while forming good electrical contact is achieved by means of printing a busbar and Pad dots and the like at designated positions. The solar photovoltaic module may stably and normally work in an appropriate working environment and ensure good electricity generation performance, but in a manufacturing process of a cell string, stable electrical connection is formed between the busbar or the Pad dots of the cell and a metal connecting ribbon by welding, and the requirement for an alignment degree between the metal connecting ribbon and the busbar of the cell is relatively high, wherein a cross section of the metal connecting ribbon used is rectangular, circular or triangular, and a welding contact area is small with general welding performance. Meanwhile, silver paste forms certain optical shielding on a surface of the cell, resulting in an optical loss of the photovoltaic cell. In addition, the silver paste is used in a large amount, which increases the cost of the photovoltaic module and is not conducive to the development of the solar photovoltaic module.

In addition, with regard to a heterojunction solar cell, there is an SWCT technology, in which the metal connecting ribbon and a composite film are compounded together, and then a film-ribbon composite unit is connected to the cell, so that this technology greatly reduces the requirement for an alignment degree between the metal connecting ribbon and the grid line, and the transparent composite film achieves mechanical connection to the same degree as welding to a certain extent. Meanwhile, in a laminating process, stable electrical contact is formed between the metal connecting ribbon and the silver paste. However, an existing technology for a single cell string unit used in this technology are relatively high in manufacturing cost, the temperature resistance and light transmission of an internal composite film are poor, contact between a plurality of metal connecting ribbons and the silver paste is unstable, and a conductive property is reduced.

In a prior patent application with the application number of CN202211005982.4, the applicant provides a manufacturing method of a novel solar photovoltaic module without a busbar, which may solve the problems that the composite film needs to be used in the prior art, and a relatively serious optical barrier is likely to be caused, so that the light transmittance of the cell decreases, the electrical conductivity decreases and the welding strength is not sufficient. However, in a welding process of the metal connecting ribbon and the cell, the problem that the metal connecting ribbon is separated from the cell may be caused due to uneven heating.

SUMMARY

1. Technical Problems to be Solved by the Present Invention

In order to solve the coating problem caused by adopting a split-type or integral jig in the prior art, the present invention provides a photovoltaic solar cell module and a manufacturing method thereof which solve the problems of difficulty in coating, unstable welding caused by uneven heating, and the like in an existing machining process.

2. Technical Solutions

In order to achieve the above object, the present invention provides the following technical solutions: a manufacturing method of a photovoltaic solar cell module includes the steps of: S1: arranging a plurality of leading connecting ribbons in an orderly manner, placing a first cell on the leading connecting ribbons, arranging a plurality of metal connecting ribbons in an orderly manner, placing the metal connecting ribbons on the first cell, and placing a main jig on a middle part of an upper side of the first cell to compress the metal connecting ribbons and the cell, wherein a length of the metal connecting ribbon is greater than a length of the cell;

S2: placing a second cell on the metal connecting ribbons beyond the cell, and then arranging a plurality of metal connecting ribbons in an orderly manner, placing the metal connecting ribbons on the second cell, placing an auxiliary jig on one side of the main jig, laminating the metal connecting ribbons on surfaces of the two adjacent cells by the auxiliary jig, and placing the main jig on a middle part of an upper side of the second cell;

S3: repeating the step of S2 according to needs to form an element cluster, that is, a cell string with the main jig and the auxiliary jig;

S4: heating the element cluster to complete welding of the metal connecting ribbons and the cells; and S5: taking down all the main jig and the auxiliary jig, applying an adhesive pattern at a designated position on a first surface of the cell string and performing curing, inverting the cell string, and applying an adhesive pattern at a designated position on a second surface of the cell string and performing curing, in order to complete fabrication of the cell string.

As a further improvement of the present invention, a plurality of pressing pins are provided on surfaces of the main jig and the auxiliary jig facing the cells, and the pressing pins compress the metal connecting ribbons and the cells.

As a further improvement of the present invention, the pressing pin is provided perpendicular to the surface of the main jig or the auxiliary jig.

As a further improvement of the present invention, a non-hollowed plate structure is adopted for both the main jig and the auxiliary jig, and after placement, the main jig and the auxiliary jig are attached to each other.

As a further refinement of the present invention, a cross-sectional area of the metal connecting ribbon is 0.00785-0.1256 mm².

As a further refinement of the present invention, the cross-sectional area of the metal connecting ribbon is 0.049-0.07 mm².

As a further refinement of the present invention, a cross section of the metal connecting ribbon is triangular, circular or rectangular.

As a further improvement of the present invention, an outer layer of the metal connecting ribbon is provided with a coating, and in step S4, a surface of the metal connecting ribbon is coated with flux prior to welding.

As a further improvement of the present invention, the adhesive pattern is a dotted pattern or a linear pattern.

As a further improvement of the present invention, the applying an adhesive pattern is achieved by means of glue dispensing or printing.

As a further improvement of the present invention, in step S5, the cell string is inverted while being kept at 40-140° C., and then the adhesive pattern is applied to the rear surface of the cell and cured.

As a further improvement of the present invention, in step S4, an alloy or metal on the surface of the metal connecting ribbon is melted and welded to the cell by heating.

The present invention further provides a photovoltaic solar cell module fabricated and formed by adopting the above manufacturing method of a photovoltaic solar cell module. The photovoltaic solar cell module includes:
- a plurality of cell strings, each cell string including a leading cell, a trailing cell, and at least one intermediate cell positioned between the leading cell and the trailing cell;
- wherein a light receiving surface of one of the adjacent cells and a light shading surface of the other cell are electrically connected through the metal connecting ribbon;
- a light shading surface of the leading cell and a light receiving surface of the trailing cell are respectively provided with a separate metal connecting ribbon for electrically leading out the cell respectively; and
- the metal connecting ribbons are connected to a front surface and the rear surface of the cell by welding, the metal connecting ribbons and fingers of the cell are provided in a cross manner, and the metal connecting ribbon on the surface of the cell is further provided with at least one adhesive pattern.

3. Beneficial Effects

Compared with the prior art, by adopting the technical solutions provided by the present invention, the following beneficial effects are obtained:

in a manufacturing process of the photovoltaic solar cell module, the solution that the main jig and the auxiliary jig cooperate together is adopted by the present invention to be able to press ribbons on the cell string prior to welding and machining, thereby eliminating the risk of unstable connection between the metal connecting ribbon and the cell, and reducing the requirement for an alignment degree between the metal connecting ribbon and the finger of the cell; in addition, as the jig is not hollowed during welding, the problem that the metal connecting ribbon is likely to be separated from the cell due to uneven heating in the prior art is avoided; and after welding, the main jig and the auxiliary jig are taken down together, thereby preventing the jigs from affecting the coating work, and being beneficial to improving the performance of the cell string.

DETAILED DESCRIPTION OF THE EMBODIMENTS

For a further understanding of contents of the present invention, the present invention will be described in detail with reference to the accompanying drawings and examples.

The structures, proportions, sizes, and the like, shown in the accompanying drawings of this specification are all merely for the purpose of cooperating with the contents disclosed in the specification for those skilled in the art to understand and read, and are not intended to limit the conditions for the implementation of the present invention, so that they have no technical substantive significance. Any structural modification, change to the proportional relationship or adjustment to the size, without affecting the effects that may be produced and the purposes that may be achieved by the present invention, all shall still fall within the scope covered by the technical contents disclosed by the present invention. Meanwhile, the terms such as "upper", "lower", "left", "right", and "middle" quoted in this specification are merely for the brevity of description and not for the limitation of the scope of implementation, and the change or adjustment to the relative relationship thereof shall also be regarded as the scope of implementation of the present invention without the substantive change to the technical contents.

Figure 1:
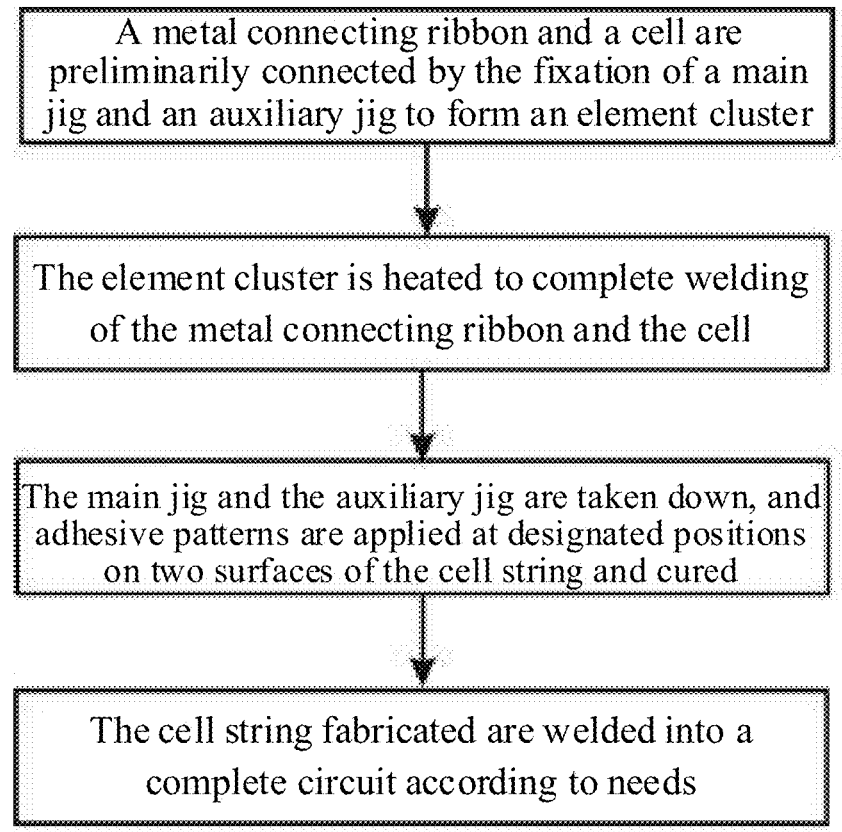
FIG. 1 is a flowchart showing steps of a manufacturing method of a photovoltaic solar cell module of the present invention.

This example provides a manufacturing method of a photovoltaic solar cell module, and general flow thereof is shown in FIG. 1. Firstly, a metal connecting ribbon and a cell are preliminarily connected by the fixation of a main jig and an auxiliary jig to form an element cluster, that is, a cell string with the main jig and the auxiliary jig; then the element cluster is carried to a welding workstation, and the welding of the metal connecting ribbon and the cell is achieved by heating; afterwards, all the main jig and the auxiliary jig need to be taken down, adhesive patterns are applied at designated positions on two sides of the cell string and cured, in order to complete fabrication of the cell string.

Each cell string manufactured includes a leading cell, a trailing cell, and at least one intermediate cell positioned between the leading cell and the trailing cell.

Wherein a light receiving surface of one of the adjacent cells and a light shading surface of the other cell are electrically connected through the metal connecting ribbon; a light shading surface of the leading cell and a light receiving surface of the trailing cell are respectively provided with a separate metal connecting ribbon for electrically leading out the cell respectively; and the metal connecting ribbon on the surface of the cell is further provided with at least one adhesive pattern.

A plurality of cell strings fabricated are connected into a complete circuit by welding according to needs, and then the flow of packaging, detection, lamination, and the like, is completed.

By improving the existing fixing process, welding process and coating process, the present invention effectively solves the problems of decreased light transmittance, reduced electrical conductivity, relatively high cost, and the like, of the cell in the conventional process while avoiding the problems of poor welding caused by uneven heating, and the like, in the prior art.

Specifically, a specific process flow of fabricating the cell string is as follows.

S1: A plurality of leading connecting ribbons are arranged in an orderly manner, a first cell is placed on the leading connecting ribbons, then a plurality of metal connecting ribbons are arranged in an orderly manner, the metal connecting ribbons are placed on the first cell, and a main jig is placed on a middle part of an upper side of the first cell to compress the metal connecting ribbons and the cell;

wherein a length of the metal connecting ribbon is greater than a length of the cell, and greater than a sum of lengths of two cells. It should be noted that the leading connecting ribbon is a separate metal connecting ribbon connected to a light shading surface of the leading cell for electrically leading out the cell.

S2: A second cell is placed on the metal connecting ribbons beyond the cell, and then a plurality of metal connecting ribbons are arranged in an orderly manner, the metal connecting ribbons are placed on the second cell, an auxiliary jig is placed on one side of the main jig, the metal connecting ribbons on surfaces of the two adjacent cells are laminated by the auxiliary jig, and the main jig is placed on a middle part of an upper side of the second cell;

it should be noted that although in the description of step S1 and step S2, firstly the main jig is placed on the first cell, and then the second cell is placed on the metal connecting ribbons, in a actual production process, the order of the two does not have a clear order relationship, and in terms of production efficiency, the production efficiency may be increased to the greatest extent by placing the main jig and the second cell simultaneously.

In addition, in the prior art, an integral jig is generally adopted for laminating surfaces of the metal connecting ribbons and the cells prior to and during welding, namely, only one jig is used for laminating one cell and the metal connecting ribbon.

However, the metal connecting ribbon is placed on the surface of the cell by being clamped by a fixture. As the fixture may also occupy a part of a working position, in the process of placing the metal connecting ribbon on the surface of the next cell, the fixture for the metal connecting ribbon needs to avoid the integral jig, the integral jig needs to be miniaturized, and then the integral jig may not sufficiently laminate the metal connecting ribbon positioned at a high end of the cell in successive years, so that an upwarp phenomenon of the metal connecting ribbons positioned at two ends of the cell exists, which will directly affect the subsequent welding process. As a result, two ends of the metal connecting ribbons may not be welded to the surface of the cell, and false welding occurs.

Therefore, in the above steps, a split-type jig is adopted, including a main jig and an auxiliary jig, wherein a plurality of pressing pins are provided on surfaces of the main jig and the auxiliary jig facing the cells, and the pressing pins are used for compressing the metal connecting ribbons and the cells. After the metal connecting ribbon is placed on the surface of the cell by the fixture, and the main jig is placed on a middle area of the cell along a direction perpendicular to the metal connecting ribbon, the fixture may be removed, so that the placement process of the metal connecting ribbon on the surface of the cell at the next station is not affected, and after the main jig is placed on the surface of the cell at the next station, the fixture may be removed.

Further, sizes and shapes of the main jig and the auxiliary jig also have many embodiments, and may be the same or different. In addition, the jig further includes taking and placing brackets positioned on two sides above the cell for placing the main jig and the auxiliary jig.

As an embodiment of structures of the main jig and the auxiliary jig, the main jig and the auxiliary jig with different shapes and sizes are adopted, and a structure for mutual cooperation between the main jig and the auxiliary jig, and the like, may be provided between the two, so that the main jig and the auxiliary jig may be better attached to each other closely. However, due to the different sizes and shapes of the main jig and the auxiliary jig, in addition to the need to place the main jig and the auxiliary jig separately in actual production, the taking and placing brackets for the main jig and the auxiliary jig should also be different, which is not conducive to improving the production efficiency. Therefore, in the case where the main jig and the auxiliary jig may be attached to each other closely, the two may be of relatively simple structures, such as two flat plates provided with pressing pins.

In addition, after the metal connecting ribbons on the surfaces of the adjacent cells are all laminated by the main jig, for example, the auxiliary jigs are respectively placed on the two sides of the main jig on the corresponding cell, for example, one cell needs to be laminated by one main jig and two auxiliary jigs, namely, the sum of the widths of one main jig and two auxiliary jigs is equal to the width of the cell. However, the above providing process of the jigs may increase the number of times of placing and taking the auxiliary jigs and the quantity of the auxiliary jigs, thereby reducing the production efficiency.

On this basis, in this example, one auxiliary jig is adopted for laminating the metal connecting ribbons on two adjacent cells, namely, the sum of the widths of one main jig and one auxiliary jig is equal to the width of a cell, so as to reduce the number of times of placing and taking the auxiliary jigs and the quantity of the auxiliary jigs, and reduce the process flow. Meanwhile, as the size of the auxiliary jig is increased, the laminating effect of the auxiliary jig in the placement direction of the metal connecting ribbons is better, namely, the effect of laminating the metal connecting ribbons on the adjacent cells by one auxiliary jig is superior to the effect of laminating the metal connecting ribbons on the corresponding cell respectively by two auxiliary jigs, thereby further improving the adhesive performance of the metal connecting ribbons and the surfaces of the cells in the subsequent welding process.

Figure 3:
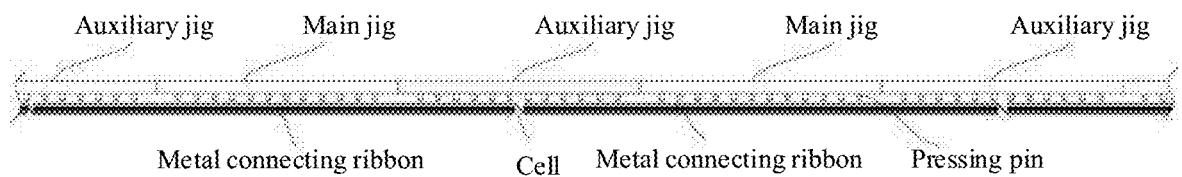
FIG. 3 is a schematic diagram showing a structure of an element cluster of the photovoltaic solar cell module of the present invention.
Figure 4:
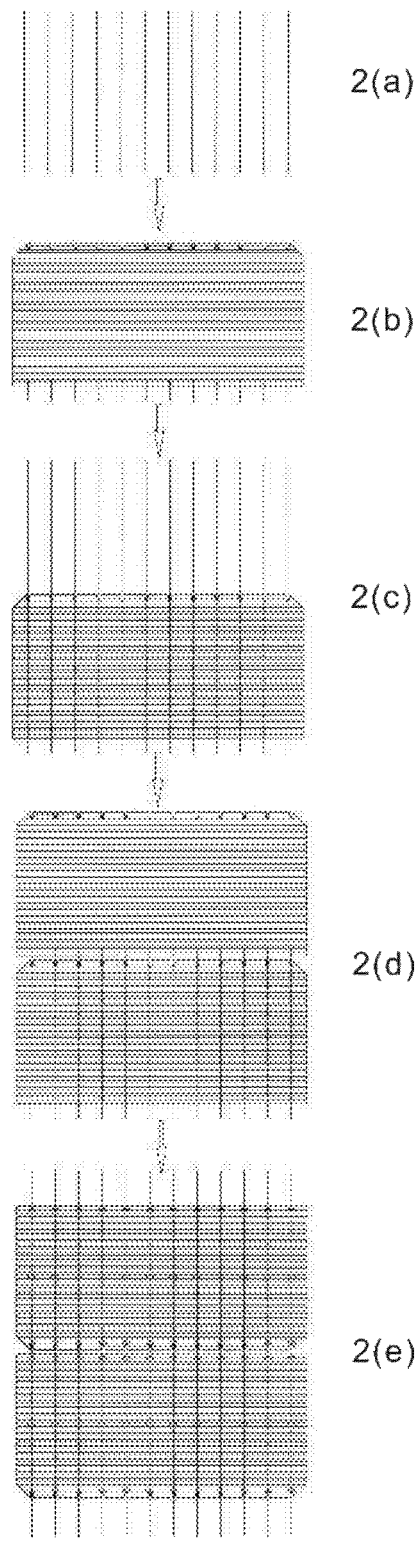
FIG. 4 is a schematic diagram showing flow of the manufacturing method of the photovoltaic solar cell module of the present invention.
Figure 5:
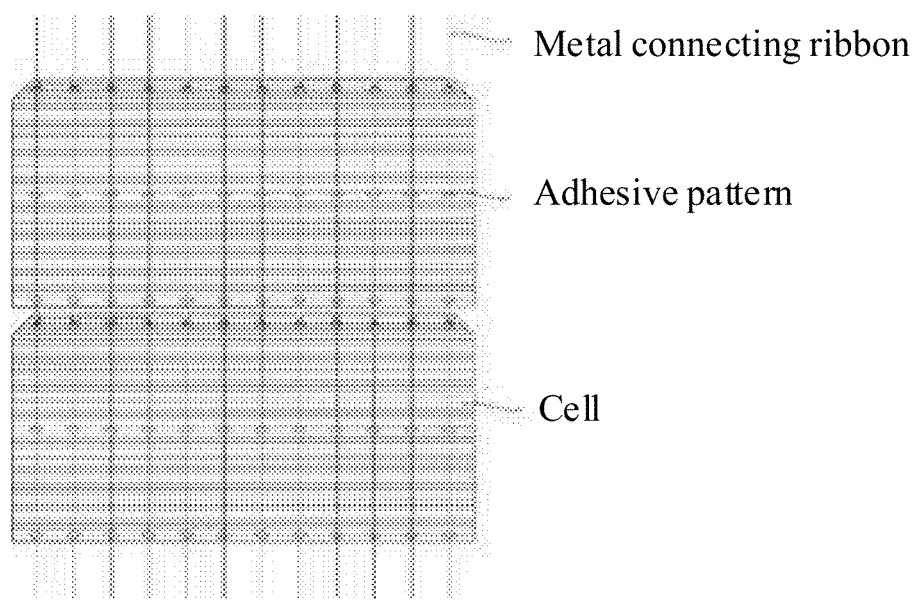
FIG. 5 is a schematic diagram showing connection between a metal connecting ribbon and a cell of the photovoltaic solar cell module of the present invention.

As an embodiment, the jig adopted in the present invention is as shown in FIG. 3, the jigs with the same sizes and shapes are adopted as the main jig and the auxiliary jig to compress the metal connecting ribbons and the cells, and the jigs are placed on the surfaces of the cells in the direction perpendicular to the metal connecting ribbons. The jig is in a shape of a flat and straight plate, and one surface of the jig is perpendicularly provided with a plurality of pressing pins, wherein an arrangement direction of the pressing pins is the same as an arrangement direction of the metal connecting ribbons.

In this example, the number of the metal connecting ribbons on the surface of the cell is 12, and therefore, the number of the pressing pins of the jig for laminating the metal connecting ribbons in the direction perpendicular to the metal connecting ribbons is also 12, while the number of the pressing pins in a direction parallel to the metal connecting ribbons is not limited, namely, the number of the pressing pins on a single metal connecting ribbon is not limited, and it is sufficient to laminate the metal connecting ribbons and the surfaces of the cells.

As other embodiments, the jig further includes taking and placing brackets positioned on two sides above the cell. In this example, in the mode of compressing the metal connecting ribbons and the surfaces of the cells by the pressing pins of the jig, the contact area with the metal connecting ribbons is greatly reduced, thereby further improving the temperature uniformity of the cells in the whole manufacturing process. In this example, a non-hollowed plate structure is adopted for both the main jig and the auxiliary jig, so that the problem of uneven heating during welding may be avoided.

S3: The step of S2 is repeated according to needs to form an element cluster, namely, a cell string with the main jig and the auxiliary jig.

Figure 2:
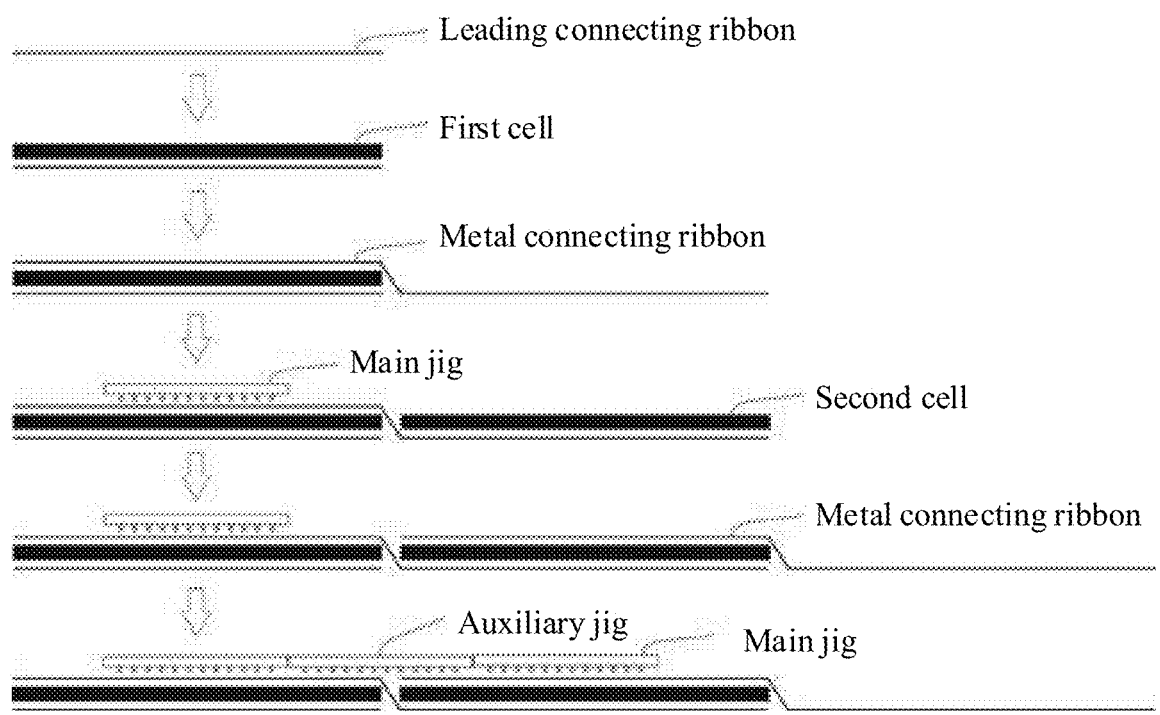
FIG. 2 is a schematic diagram showing flow of a fixing process in the manufacturing method of the photovoltaic solar cell module of the present invention.

In this example, in steps S1-S3, the metal connecting ribbons and the cells are preliminarily connected by the fixation of the main jig and the auxiliary jig, referring to FIG. 2 for operation flow.

S4: The element cluster is heated to complete welding of the metal connecting ribbons and the cells.

Wherein an outer layer of the metal connecting ribbon is provided with a coating, and in this step, the surface of the metal connecting ribbon needs to be coated with flux prior to welding.

In this step, the metal connecting ribbons are heated by means of infrared heating, and the like, so that the cells and the metal connecting ribbons are preliminarily welded together. Referring to FIG. 3 for a connection mode of the cells and the metal connecting ribbons, one cell string consists of a leading cell, a trailing cell, and at least one intermediate cell positioned between the leading cell and the trailing cell.

In addition, in order to be able to perform a coating process without a jig after the welding process, the metal connecting ribbon is improved in the present invention. In the art, the thickness of the metal connecting ribbon directly affects the adhesive performance between the metal connecting ribbon and the cell, and if the cross-sectional area of the metal connecting ribbon is too small, the series resistance between the cells may be increased, and the expected bonding strength may not be achieved. In a process of removing the jig after the welding process, the metal connecting ribbon is likely to be separated from the surface of the cell, and if the cross-sectional area of the metal connecting ribbon is too large, the cell may be shielded, thereby affecting the cell conversion efficiency of the cell module.

As other embodiments, the cross-sectional area of the metal connecting ribbon used for connection may be selected to be 0.00785-0.1256 mm$^2$, preferably 0.049-0.07 mm$^2$, for example, 0.052 mm and 0.064 mm are adopted.

Within this range, the series resistance may be decreased, and the adhesive performance between the metal connecting ribbon and the surface of the cell may also be ensured.

Further, the outer layer of the metal connecting ribbon further includes a metal alloy coating, wherein a coating material is a metal alloy such as SnPbBi, SnBiAg, SnPb, SnAg, SnIn and SnAgCu, and prior to welding, the surface of the metal connecting ribbon is further coated with flux, so that stable connection is formed between the metal connecting ribbon and the surface of the cell and the finger in the welding process.

S5: All the main jig and the auxiliary jig are taken down, an adhesive pattern is applied at a designated position on a first surface of the cell string and curing is performed, the cell string is inverted, and an adhesive pattern is applied at a designated position on a second surface of the cell string and curing is performed in order to complete fabrication of the cell string.

After the cell string is formed, the cell string needs to be packaged by a subsequent process, and in this process, the metal connecting ribbon is likely to be separated from the surface of the cell, resulting in a decrease in the conversion efficiency of the whole cell string, and therefore, a bonding force between the metal connecting ribbon and the surface of the cell and a finger ribbon needs to be reinforced. In the present invention, by applying the adhesive patterns at the designated positions on the first surface and the second surface of the cell string and performing curing, it is further ensured that stable connection is formed between the metal connecting ribbon and the surface of the cell and the finger. Specifically, in the process of applying the adhesive patterns at the designated positions, optionally, a camera is used for assisted positioning, so as to ensure that good connection may be formed between the positions where the adhesive patterns are applied and the metal connecting ribbon. Specifically, the adhesive pattern is coated at a designated position on the surface of the metal ribbon of the welded cell-metal ribbon, the camera is used for assisted positioning, and the adhesive pattern is applied in the forms including but not limited to symmetrical dotting on two sides of a solder ribbon, asymmetrical dotting, scribing (a short line and a long line), coating along the whole solder ribbon, and coating on the whole surface. For example, the adhesive pattern may be a dotted pattern or a linear pattern, or other irregular patterns which may achieve the effect of reinforcing the metal connection. When the adhesive pattern is the dotted pattern, a bottom surface thereof may be circular, semi-spherical or semi-ellipsoidal as a whole, or the bottom area may be short lines formed by close arrangement of a plurality of dots, and has a shape with a certain height in space; and when the adhesive pattern is the linear pattern, the adhesive pattern is intermittently coated on the metal connecting ribbons and may be entirely covered on the metal connecting ribbons. In addition, in other embodiments, the adhesive pattern may also cover the whole surface of the cell.

Further, a specific mode of applying the adhesive pattern is applying without the jig.

In the implementation of the coating process, when the split-type jig is adopted for laminating, although the coating with the jig may ensure that the metal connecting ribbon is closely attached to the surface of the cell, it is necessary to ensure that the surface of the cell is laminated by at least one of the main jig and the auxiliary jig, or the main jig and the auxiliary jig are hollowed. In the above solutions, such as the technical solution of laminating the surface of the cell by at least one of the main jig and the auxiliary jig, due to the existence of a part of the jigs, the jig may interfere with the working of a coating mechanism, so that the difficulty of the coating process is increased, and then the adhesive pattern may not be accurately applied at the designated position, especially coating of a plurality of adhesive patterns, scribing coating, coating along the whole solder ribbon, and coating on the whole surface may not be implemented at all.

In order to avoid the above situation, if the technical solution of hollowing the main jig and the auxiliary jig is adopted, in the process of coating the adhesive pattern with the jig, when the adhesive pattern is coated, the jig enables the metal connecting ribbon to closely attached to the surface of the cell. However, during specific implementation, it was found that the service life of a product machined with this solution is relatively short. Through analysis, it is found that in order to implement the solution of coating with the jig and then hollowing the jig, in the welding process, the welding of the cell and the metal connecting ribbon is achieved by means of infrared heating, and the jig is also required during the welding to generate complete lamination on the metal connecting ribbon. However, the above arrangement mode may result in a relatively large difference between a welding temperature of the metal connecting ribbon corresponding to a hollowed position and a welding temperature of the metal connecting ribbon at a non-hollowed position, and finally result in a relatively large difference between the welding effect at the hollowed position and the welding effect at the non-hollowed position, so that uneven welding of the metal connecting ribbon and the surface of the cell, thereby seriously affecting the electrical contact between the metal connecting ribbon and the cell and affecting the service life.

Therefore, in this example, preferably, the split-type jig is adopted for laminating, and both the main jig and the auxiliary jig are non-hollowed, and the coating process is performed without the jig. Specifically, the main jig and the auxiliary jig are all taken down prior to applying and coating, and then coating operation of the adhesive pattern is performed to further reinforce the welded cell string. Therefore, in order to further improve the bonding force between the metal connecting ribbon and the surface of the cell after welding, it is necessary to improve the coating and the flux of the metal connecting ribbon, the thickness of the metal connecting ribbon, and the laminating mode of the main jig and the auxiliary jig, so as to reduce the phenomenon of separation of the metal connecting ribbon from the surface of the cell caused by the operation of taking down the jigs, uneven temperature and the like before coating the adhesive pattern.

The specific mode is as follows: the split-type jig is adopted, including the main jig and the auxiliary jig, wherein the direction of arrangement of the jig is perpendicular to the direction of the metal connecting ribbon, the main jig is provided in the middle area, the auxiliary jig is provided on two sides of the main jig, and the metal connecting ribbons on the surfaces of two adjacent cells are laminated by the auxiliary jig, and the metal connecting ribbons and the cells are further compressed, so as to improve the welding effect of the metal connecting ribbons and the surfaces of the cells and the finger ribbon in the subsequent welding process; and in order to be able to perform coating by means of coating of a plurality of adhesive patterns, scribing coating, coating along the whole solder ribbon, coating on the whole surface, and the like, in this example, after the main jig and the auxiliary jig are all taken down, the adhesive pattern is coated by a sequential coating process at the designated position on the whole surface of the cell, and the designated position is the surface of the welded metal connecting ribbon.

In the prior art, in order to ensure that the metal connecting ribbon is closely attached to the surface of the cell in the process of coating the adhesive pattern, the coating with the jig is selected. However, due to the existence of a part of the jigs, when performing the processes such as coating of a plurality of adhesive patterns, scribing coating, coating along the whole solder ribbon, coating on the whole surface, the difficulty of the coating process may be increased, the number of times of coating may be increased, and then the process cycle may be increased. Therefore, in this example, the surface of the metal connecting ribbon is provided with an alloy or a metal having better adhesiveness, so that after the preliminary welding, on the basis that the adhesive performance between the metal connecting ribbon and the surface of the cell is further improved, the jig is not required for lamination in the process of coating the adhesive pattern, and then the coating process without the jig may be performed, so that the coating processes such as coating of a plurality of adhesive patterns, scribing coating, coating along the whole solder ribbon, coating on the whole surface may be performed, and the coating efficiency and productivity may be improved simultaneously.

In this step, the adhesive pattern is applied to the first surface of the welded cell string and cured, and then inverted for applying the adhesive pattern on the second surface, wherein the first surface may be a front surface of the cell string, and the second surface may be a back surface of the cell string, or the first surface may be the back surface of the cell string, and the second surface may be the front surface of the cell string.

In this step, it is also necessary to maintain the temperature during carrying, and the temperature range is 40-140° C., so that thermal stress of metal may be released slowly, and a certain temperature may be ensured, so as to ensure that the temperature difference between the welding process and an inverting workstation is not too large, and ensure that the greater stress is released after the adhesive pattern is applied. It should be noted that after welding, stable connection is formed between the metal ribbon and the grid ribbon, and the bonding force is greater than the bonding force between the grid ribbon and the cell. If the thermal stress of the metal is released quickly as the temperature is not maintained in the carrying process, when the metal ribbon is contracted, the grid ribbon is broken by pulling, which may lead to the fracture of the grid ribbon, so that the whole product is damaged.

Finally, the above steps are repeated, a plurality of cell strings are placed according to a certain rule, a placement position is glass on which a packaging adhesive film is laid, the cell strings are connected into a complete circuit required in a certain mode by welding, and processes such as packaging-detection-lamination and the like are completed in subsequent operation.

In this example, in a welding working procedure, effective electrical connection needs to be formed between the metal connecting ribbon and the finger; the cell string is formed by welding a leading cell, a trailing cell, and at least one intermediate cell positioned between the leading cell and the trailing cell together, and materials such as the metal connecting ribbon provided with the coating which is cut into a plurality of strands and the cell are arranged in sequence by means of the jig and the manipulator, so that the front surfaces and the rear surfaces of the connected cells are welded into the cell string by means of a plurality of strands of solder ribbons bonded with flux; and the adhesive pattern is cured to completely eliminates the risk of unstable connection.

In addition, applying the adhesive pattern may be achieved by means of glue dispensing or printing, and the glue used may be adhesives such as UV glue and hot melt glue.

It should be noted that in order to improve the process efficiency, the adhesive patterns may be applied to surfaces of the cells which are connected in series and cured in the subsequent series connection process of the cells. In addition, after a plurality of cells are connected in series, the inverting process is performed after surfaces of all the cells are welded, applied with the adhesive patterns and cured, then other surfaces of the cells are applied with the adhesive patterns and cured, and a certain temperature needs to be maintained during carrying and inverting, so as to prevent the grid ribbon from being broken as thermal stress is released too quickly.

By adopting the technical solutions provided by the present invention, compared with the prior art, in the present invention, through interrelated technical improvements on the structure and pretreatment of the metal connecting ribbon, the structure and placement position of the jig, the coating mode, and the like, the mechanical strength of the metal connecting ribbon and the cell is improved as a whole, and good electrical contact is formed, so as to achieve the purposes of improving the manufacturing process and providing the cell module with stable performance, wherein the adhesive performance of the metal connecting ribbon and the surface of the cell is improved by improving and pretreating the structure of the metal connecting ribbon, so that the coating process without the jig may be performed after the welding process; by providing pressing pins on the jig, and by providing one auxiliary jig for laminating the metal connecting ribbons on two adjacent cells to replace a plurality of auxiliary jigs for laminating the corresponding cells respectively, the laminating effect is improved, the temperature uniformity in the welding process of the metal connecting ribbons is improved, and the stability of welding of the metal connecting ribbons and the cells is further improved; in addition, in order to improve the problem of the temperature difference between the metal connecting ribbons in the welding process, the jig is non-hollowed, and the coating process without the jig is selected; and the coating process is performed without the jig, thereby reducing the difficulty of the coating process, decreasing the number of times of coating simultaneously, and then achieving the purposes of shortening the process cycle and improving the production efficiency.

In a second example of the present invention, based on the previous example, the improvement on the photovoltaic solar cell according to the present invention will be described in detail in this example specifically as follows.

According to the present invention, front and rear surfaces of the cell required are designed by removing PAD dots, the front and rear surfaces of the cell with/without a busbar may be selected according to needs, and the finger of the cell may be selected to be thickened at a designated position according to needs. According to the electrical conductivity and optical requirements, the photovoltaic module needs to use different numbers of metal connecting ribbons with corresponding different diameters to complete the connection between cell units, and the grid ribbon needs to complete the connection part with the metal connecting ribbon is at the designated position. In addition, the arrangement of a thickened portion may increase the bonding force between the cell and the metal connecting ribbon, and ensure the contact between the metal connecting ribbon and the finger prior to applying the adhesive pattern and reinforcing, so as to ensure that effective electrical connection may be formed.

In this example, the shape of the thickened portion is not limited, and it is sufficient to achieve the purpose of enhancing the bonding force between the finger and the metal connecting ribbon, and between the finger and the cell, and the shape may be a diamond shape, a triangle shape, an oval shape, and the like. In this example, the thickened portion has a shape of the diamond shape or the triangle shape. The finger and the thickened portion may be formed by printing once or step-by-step printing twice. Specifically, according to the requirement for welding stability, thickening is performed at the leading/trailing/middle positions of the cell, and the thickening mode may be thickening by printing once or printing twice. Optionally, screen printing or stencil printing may be used for printing. Preferably, different pastes may be selected for the two times of printing. Specifically, when the different pastes are adopted for printing to form the finger and the thickened portion, the paste adopted for printing the finger has better conductivity than the paste adopted for printing the thickened portion, and the paste adopted for printing the thickened portion has better adhesiveness than the paste adopted for the finger, so as to ensure the conductive effect of the metal connecting ribbon and the cell, and also ensure the bonding force at the connecting position of the metal connecting ribbon and the cell.

Figure 6:
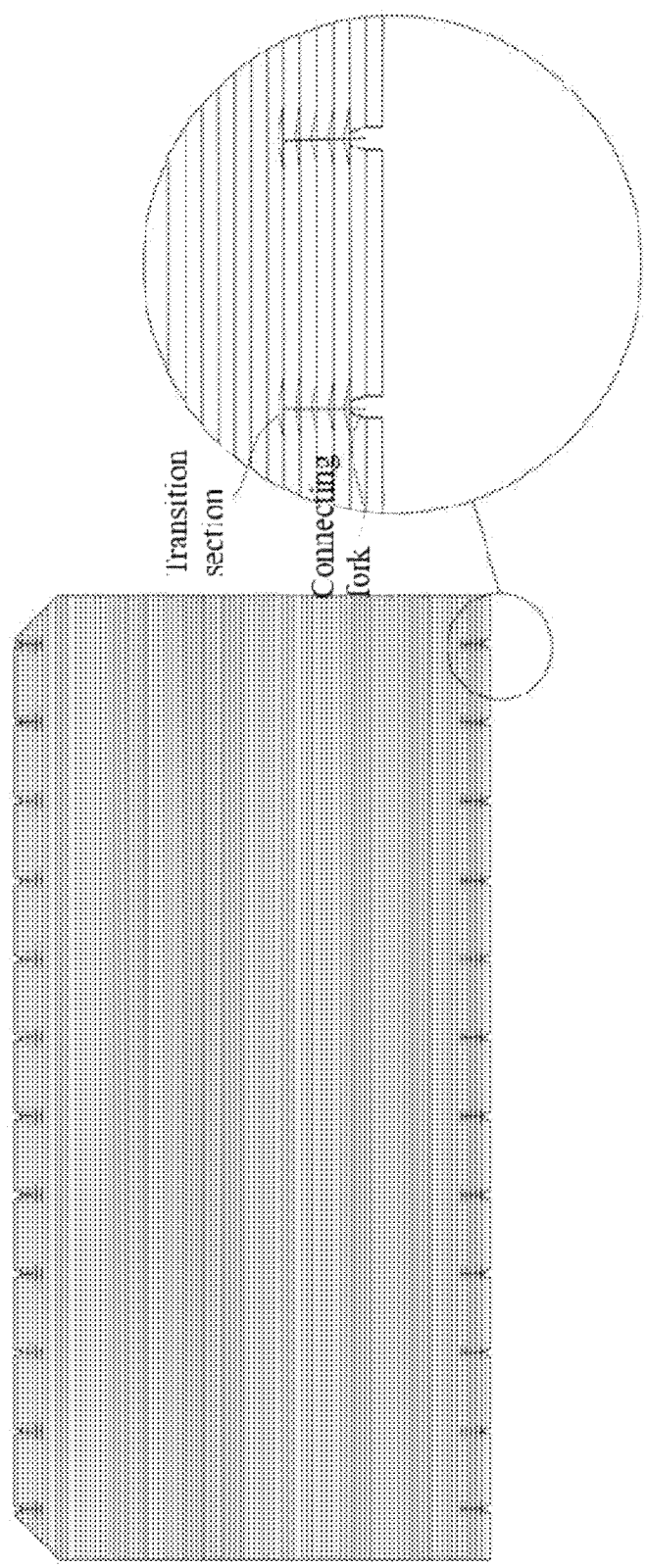
FIG. 6 is a schematic diagram showing a structure of a single cell in the photovoltaic solar cell module of the present invention.

Optionally, as shown in FIG. 6, two end areas of the cell are further provided with reserved busbar ribbons and connecting fork which are connected to the finger along a series connection direction of the cell. The thickened portion may be a transition section at an intersection position with the reserved busbar ribbon on the finger, one end of the transition section is connected to the reserved busbar ribbon, and the other end thereof is connected to the finger, wherein the width of the transition section gradually narrows from one end close to the reserved busbar ribbon to one end away from the reserved busbar ribbon. The above arrangement is beneficial to increasing the bonding force between the finger of the cell and the metal connecting ribbon, so as to ensure that effective connection may be formed between the metal connecting ribbon and the finger after welding and prior to applying the adhesive pattern and reinforcing. The setting of the width of the transition section may also affect the contact area, thereby directly affecting the contact stability.

Optionally, the number of the fingers provided with the thickened portions in two end areas of the cell is 1-8, the thickened portions are positioned at the positions where the fingers are intersected with the metal connecting ribbons, and the above fingers are in spaced distribution or closely adjacent distribution. In addition to the fingers in the two end areas being provided with the thickened portions, in order to further share the metal stress and improve the stability, the fingers may also be provided with the thickened portions in other areas than the two end areas of the cell, the number of the fingers provided with the thickened portions is 0-5, and the above fingers are in spaced distribution or closely adjacent distribution.

In other example, the spaced distribution is that the thickened portions are provided at odd or even positions by counting from two ends of the cell, and the closely adjacent distribution is that all the fingers provided with the thickened portions are lean against each other without any space.

The present invention and the embodiments thereof are described above schematically without limitation, the accompanying drawings show only one of the embodiments of the present invention, and the actual structure is not limited thereto. Therefore, all structural modes and examples thereof similar to the technical solutions designed by those ordinarily skilled in the art inspired by the present invention without departing from the inventive purpose of the present invention and without involving any inventive effort shall fall within the protection scope of the present invention.

What is claimed is:

1. A manufacturing method of a photovoltaic solar cell module, comprising the steps of:
   S1: arranging a plurality of leading connecting ribbons in an orderly manner, placing a first cell on the leading connecting ribbons, arranging a plurality of metal connecting ribbons in an orderly manner and placing the metal connecting ribbons on the first cell, and placing a main jig on a middle part of an upper side of the first cell to compress the metal connecting ribbons and the cell, wherein a length of the metal connecting ribbon is greater than a length of the cell;
   S2: placing a second cell on the metal connecting ribbons beyond the cell, and then arranging a plurality of metal connecting ribbons in an orderly manner and placing the metal connecting ribbons on the second cell, placing an auxiliary jig on one side of the main jig, laminating the metal connecting ribbons on surfaces of the two adjacent cells by the auxiliary jig, and placing the main jig on a middle part of an upper side of the second cell;
   S3: repeating the step of S2 according to needs to form an element cluster, that is, a cell string with the main jig and the auxiliary jig;
   S4: heating the element cluster to complete welding of the metal connecting ribbons and the cells; and
   S5: taking down all the main jig and the auxiliary jig, applying an adhesive pattern at a designated position on a first surface of the cell string and performing curing, inverting the cell string, and applying an adhesive pattern at a designated position on a second surface of the cell string and performing curing, in order to complete fabrication of the cell string.

2. The manufacturing method of a photovoltaic solar cell module according to claim 1, wherein a plurality of pressing pins are provided on surfaces of the main jig and the auxiliary jig facing the cells, and the pressing pins compress the metal connecting ribbons and the cells.

3. The manufacturing method of a photovoltaic solar cell module according to claim 2, wherein the pressing pin is provided perpendicular to the surface of the main jig or the auxiliary jig.

4. The manufacturing method of a photovoltaic solar cell module according to claim 2, wherein a non-hollowed plate structure is adopted for both the main jig and the auxiliary jig, and after placement, the main jig and the auxiliary jig are attached to each other.

5. The manufacturing method of a photovoltaic solar cell module according to claim 4, wherein a cross-sectional area of the metal connecting ribbon is 0.00785-0.1256 $mm^2$.

6. The manufacturing method of a photovoltaic solar cell module according to claim 5, wherein the cross-sectional area of the metal connecting ribbon is 0.049-0.07 $mm^2$.

7. The manufacturing method of a photovoltaic solar cell module according to claim 6, wherein a cross section of the metal connecting ribbon is triangular, circular or rectangular.

8. The manufacturing method of a photovoltaic solar cell module according to claim 5, wherein an outer layer of the metal connecting ribbon is provided with a coating, and in step S4, a surface of the metal connecting ribbon is coated with flux prior to welding.

9. The manufacturing method of a photovoltaic solar cell module according to claim 1, wherein the adhesive pattern is a dotted pattern or a linear pattern.

10. The manufacturing method of a photovoltaic solar cell module according to claim 1, wherein the applying an adhesive pattern is achieved by means of glue dispensing or printing.

11. The manufacturing method of a photovoltaic solar cell module according to claim 1, wherein in step S5, the cell string is inverted while being kept at 40-140° C., and then the adhesive pattern is applied to the rear surface of the cell and cured.

12. The manufacturing method of a photovoltaic solar cell module according to claim 1, wherein in step S4, an alloy or metal on the surface of the metal connecting ribbon is melted and welded to the cell by heating.

13. A photovoltaic solar cell module fabricated and formed by the manufacturing method of a photovoltaic solar cell module according to claim 1, wherein the photovoltaic solar cell module comprises:
   a plurality of cell strings, each cell string comprising a leading cell, a trailing cell, and at least one intermediate cell positioned between the leading cell and the trailing cell;
   wherein in respect of the two adjacent cells a light receiving surface of the one cell and a light shading surface of the other cell are electrically connected through the metal connecting ribbon;
   a light shading surface of the leading cell and a light receiving surface of the trailing cell are respectively provided with a separate metal connecting ribbon for electrically leading out the cell respectively; and
   the metal connecting ribbons are connected to a front surface and the rear surface of the cell by welding, the metal connecting ribbons and fingers of the cell are provided in a cross manner, and the metal connecting ribbon on the surface of the cell is further provided with at least one adhesive pattern.

* * * * *